United States Patent [19]

Lo

[11] Patent Number: 4,897,680
[45] Date of Patent: Jan. 30, 1990

[54] PHOTOGRAPHIC CAMERAS

[76] Inventor: Anthony T. Lo, A12 Olympian Mansion, 9 Conduit Road, Hong Kong, Hong Kong

[21] Appl. No.: 339,833
[22] Filed: Apr. 18, 1989

[30] Foreign Application Priority Data

Apr. 18, 1988 [GB] United Kingdom ............... 8809142

[51] Int. Cl.$^4$ ............................................. G03B 15/05
[52] U.S. Cl. ............................ 354/145.1; 354/149.11; 362/18
[58] Field of Search .................. 354/126, 145.1, 149.1, 354/149.11; 362/3, 16, 17, 18

[56] References Cited

U.S. PATENT DOCUMENTS

| | | | |
|---|---|---|---|
| 3,223,010 | 12/1965 | Rentschler | 354/149.11 |
| 3,286,611 | 11/1966 | Lange | 354/126 |
| 4,078,170 | 3/1978 | Sloop | 354/126 |
| 4,121,232 | 10/1978 | Jones | 354/126 |
| 4,279,488 | 7/1981 | Hines | 354/149.11 |
| 4,702,581 | 10/1987 | Yamada et al. | 354/149.11 |

FOREIGN PATENT DOCUMENTS 2115181A 9/1983 United Kingdom ............ 354/145.1

*Primary Examiner*—A. A. Mathews
*Attorney, Agent, or Firm*—Finnegan, Henderson, Farabow, Garrett & Dunner

[57] ABSTRACT

A camera with an electronic flash unit inset substantially flush with the top, bottom or side of the camera housing so that its light is directed generally outwardly of the axis of the camera lens. A reflector hinged to the top, bottom or side over that flash unit to reflect the light forwardly into the area of a scene being photographed. The flash unit includes a flash tube with a parabolic reflector to concentrate the light in one axis and the reflector having a generally curved shape to concentrate the light in an axis at right angles, so concentration the light in the area of a scene being photographed.

7 Claims, 2 Drawing Sheets

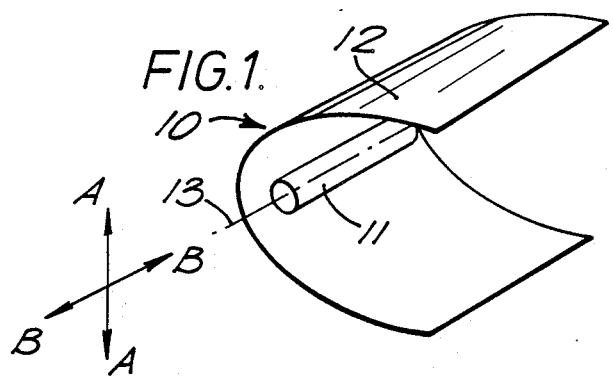
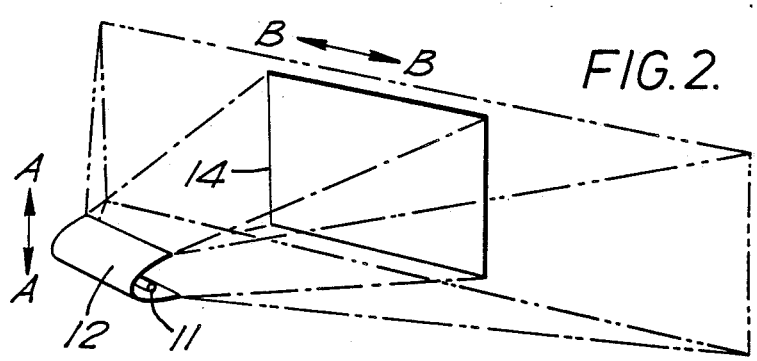
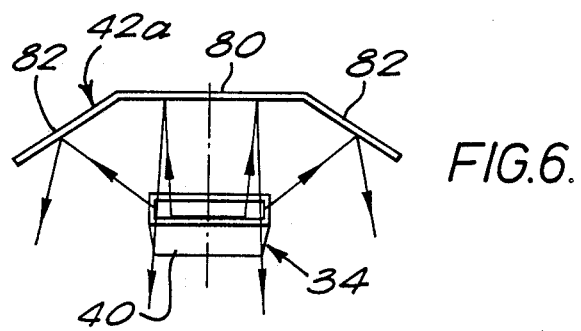

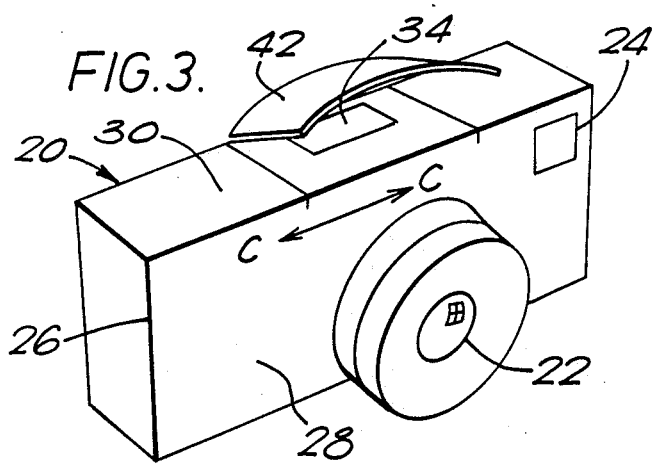
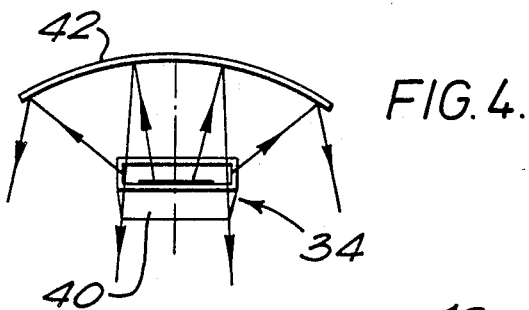
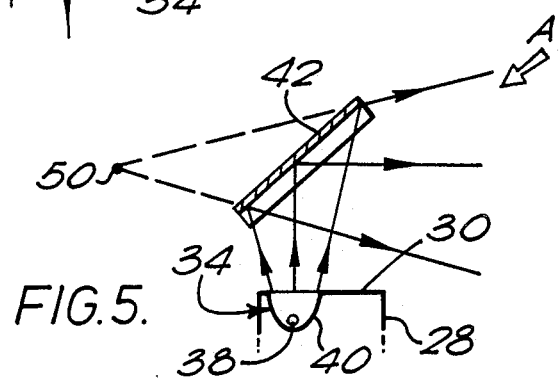

PHOTOGRAPHIC CAMERAS

This invention relates to improvements in photographic cameras and in particular those provided with an integral electronic flash unit.

BACKGROUND TO THE INVENTION

There are many types of camera on the market which have their own integral built-in electronic flash. Sometimes the flash unit is incorporated into the front face of the camera and is activated simply by means of a switch. In other cases, the flash unit is in a "pop-up" housing such that, when the flash is to be used, the electronic flash housing is raised from the main body of the camera to an upstanding position.

In small cameras, however, there are often difficulties in positioning the electronic flash unit simply because of restrictions on space.

Further, the conventional form of electronic flash unit is a short straight flash tube and the light output from such a tube is by no means spatially regular. Generally a channel-shaped parabolic reflector whose axis extends parallel to the tube axis is provided. This ensures that there is a good uniform spread of the light forwardly of, and at right angles to, the longitudinal axis of the tube, i.e. when taking a photograph with the camera in the normal orientation, the spread of light is relatively uniform from top to bottom of the scene. However, there is little control over the spread of light width-wise by the parabolic reflector and therefore a great deal of light is often wasted into the side areas beyond the limit of the scene being photographed. With small readily portable cameras, this is a serious disadvantage because the flash unit is in any case relatively small and compact and so has a restricted light output and therefore any waste of light not directed into the area being photographed can be a serious disadvantage.

The invention has therefore been made with these problems in mind and aims to provide an improved camera having an integral flash unit which is capable of giving better illumination of the scene and were the flash unit will fit conveniently into the camera.

BRIEF SUMMARY OF THE INVENTION

According to the invention, there is provided a camera with a housing having a front face carrying the lens through which light from the scene being photographed passes to the interior of the camera for recording on a photographic recording medium, an electronic flash unit inset into the housing so as not to project significantly beyond the housing, and mounted so as to direct its light in an outward direction relative the forward direction viewed by the camera lens, and a hinged reflector positioned over the flash unit which can be hinged flush with the housing when the flash unit is not in use and hinged to an inclined position when the flash unit is to be used whereby light from the flash unit passes to the reflector which then reflects the light forwardly in the direction viewed by the camera lens, the reflector being shaped such that light from the flash unit is directed predominantly into the area of a scene from which light will be collected by the camera lens for the picture, so avoiding significant wastage of light into areas outside the said area of the scene.

This arrangement has a number of important advantages. Thus, generally speaking, there is spare room at the top, side or bottom faces, i.e. a non-front or rear face, particularly the top face, of the camera housing and so the flash unit can conveniently be placed in that position and positioned so that its light is directed outwardly. Also, the flash unit can be mounted in a stationary position within the camera housing which again has advantages in that it is not then necessary for the flash tube to move so causing movement and bending of the high tension leads connected to it which can otherwise easily fail in cameras where the flash unit is provided in a separate "pop-up" housing.

The camera housing is generally of a rectangular parallelopiped shape and in a preferred embodiment the flash unit is inset into the top face of the housing, with the reflector hinged to the rear of that top face and positioned over the unit.

The reflector is shaped so as to ensure that a maximum amount of light is reflected from the tube onto the area of the scene which will be viewed by the camera lens an preferably it is of generally curved shape to reflect light spreading beyond the ends of the flash unit back into the area of the scene being photographed.

The flash unit will generally comprise a length of flash tube extending transversely across the axis of the lens, side to side of the camera housing in the case where the unit is inset in the top of the housing, and a channel-shaped parabolic reflector is provided which will concentrate the light in a relatively concentrated beam outwardly. However, because of the length-wise extending direction of the tube and the corresponding channel-shaped parabolic reflector, a great deal of light tends to spread out side to side. This, however, can be collected by the ends of the curved reflector when in its upwardly inclined position and, by virtue of the curved shape of the reflector, directed back into the scene being viewed by the camera lens so concentrating the amount of light in that scene and reducing the amount of light which appears beyond the side edges of the scene.

If the flash unit is mounted in a side face and the reflector hinged to that face, a similar effect can be achieved but the reflector will need to be of different curvature from a reflector mounted on the top or bottom face of the camera to achieve a similar effect but this can readily be determined by plotting the paths of typical light rays.

Another advantage of the invention is that the reflector can be hinged down flush with the housing of the camera when the flash unit is not to be used so covering and protecting the flash unit and retaining the camera in its normal stored position in a compact format.

Further, because the illumination of the scene by the flash unit originates from a virtual source behind the reflector, e.g. above the top surface of the camera housing when the reflector is mounted on the top face of the camera, the upright spacing between that virtual source and the axis of the camera lens is relatively large which is desirable to avoid the well known "red eye" effect, i.e. the reflection back from the retina of the eyes, which can occur when the source of a flash unit is very close to the axis of the camera lens.

BRIEF DESCRIPTION OF THE DRAWINGS

The invention will now be illustrated, by way of example, with reference to the accompanying drawings, in which:

FIG. 1 is a diagram of a typical flash unit;

FIG. 2 is a diagram showing the typical illumination by a unit as shown in FIG. 1;

FIG. 3 is a perspective view of a camera according to the invention;

FIG. 4 is a diagram showing the operation of the light reflector in the camera shown in FIG. 3;

FIG. 5 is a diagram from the side showing the operation of the camera according to the invention; and FIG. 6 is a diagram similar to FIG. 4 but showing a modified form of light reflector.

DESCRIPTION OF THE PREFERRED EMBODIMENTS

Referring first of all to FIG. 1, a conventional electronic flash 10 generally consists of a flash tube 11 from which the light is emitted and which is provided with a channel-shaped parabolic reflector 12. The light output pattern from such an electronic flash device is well controlled along the axis A—A. i.e. at right angles to the axis 13 of the flash tube. Thus light emitted in that direction tends to be reflected and concentrated by the reflector 12 onto a rectangular area 14 (FIG. 2) viewed by a camera lens.

By contrast, the spread of light is not controlled in the direction B—B, i.e. parallel to the axis 13 of the flash tube. Referring again to FIG. 2, the light is liable to spread very widely in the direction B—B since there is nothing to control the spread of the light beyond the edges of the area 14 and so the light is liable to spread well beyond the side edges of the area 14 viewed by the camera lens.

This is a serious problem in small cameras with a relatively small flash unit since the amount of light available is in any case quite limited. Thus, the light reaching the areas on either side of the area 14 viewed by the camera lens is wasted.

A camera 20 according to the invention is shown in FIG. 3. The camera has a typical camera lens 22 at the front and a view finder 24.

The camera comprises a housing 26 having a front face 28 in which the camera lens is positioned and a top 30. Towards the rear and in the center of the top 30 is a recess in which is positioned an electronic flash unit 34 which can be substantially identical to the flash unit 10 shown in FIG. 1, in other words it can be a conventional electronic flash unit and as such is not believed to require further description. The unit 34 is positioned with the longitudinal axis of its flash tube 38 extending in the direction C—C. The light from the flash unit 34 is emitted in an upright sense after having been concentrated to some extent by the use of a channel-shaped parabolic reflector 40, the reflector axis coinciding, at least approximately, with the longitudinal axis of the tube 38.

Mounted on the top of the camera housing is a curved reflector 42. This is hinged at its rear to the rear edge of the top 30 of the camera and is moveable between a raised position shown in FIG. 3 and a flat position where it lays substantially flush with the top of the camera and covers the flash unit 34.

As best shown in FIG. 5, when the reflector is raised to its inclined position where it is angled at about 45° to the top 30, it will act to reflect the light emitted upwardly by the flash tube 38 and reflector 40 into a forward direction towards the scene to be viewed and photographed by the camera lens.

In the section shown in FIG. 5 which is taken fore and aft of the camera, the reflector 42 is substantially flat. It is not necessary for the reflector to be curved in this sense since the channel-shaped parabolic reflector 40 has the effect of concentrating the light from the tube in this axis into a beam of about the right width to cover the scene being viewed by the camera lens in the same way as described in connection with the axis A—A in FIGS. 1 and 2.

By contrast, the reflector is curved in a direction from side to side and this can be seen from FIG. 4. The curvature is chosen so as to concentrate the light, which would otherwise tend to spread widely in a side-to-side sense, and reflect it into an area only slightly wider than the area viewed by the camera lens in the width-wise sense.

The camera 20 has a number of advantages in that it is not necessary for the flash tube 38 to move and be placed in a raised position as is often the case with many cameras. This has the advantages in eliminating the necessity to move the high tension leads which connect to the flash unit 34 and tube 38 which can damage and break them.

The reflector 40 also has the effect of concentrating all of the available light from the flash tube and so providing more light in the area viewed by the camera lens to ensure that the best possible use is made of the light output. In practice I have found as a result one increases the guide number of the flash unit by 1 to 1½ steps as compared with a conventional flash tube of the same size. This is particularly important in cameras having a relatively small lens aperture.

It is often difficult to find a convenient position on the camera housing in which to position a flash unit. There is however often space available in the position where the flash unit 34 is positioned in the camera 20 since it can be positioned there clear of all other operating mechanisms of the camera and does not interfere with the front face of the camera where space is at a premium.

Finally, the virtual origin 50 (FIG. 5) of the light from the flash unit 34 is spaced above the top 30 of the camera and therefore spaced well above the axis of the camera lens 22. This has the effect of reducing "red eye" effects in the photograph being produced.

An alternative shape of reflector 42a is shown in FIG. 6. In this reflector there is no smooth curving in the width wise direction of the camera. Instead the reflector has a central portion 80 flanked by side portions 82. In the plane viewed in FIG. 6, the central portion 80 is substantially flat. It will, therefore, reflect forwardly into the area viewed by the lens 22 the light which it receives directly from the flash tube 38. The side portions 82 are angled relative the central portion. Therefore, they are able to reflect the light which tends to spread out sideways from the flash tube 38 back into the area viewed by the lens 22 in an equivalent fashion to that described in connection with the smoothly curved reflector 42 shown in FIG. 4.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

I claim

1. A camera comprising a housing, a front face to said housing the lens in said front face viewing a forward direction and through which light from a scene being photographed passes to the interior of the camera for recording on a photographic recording medium, an electronic flash unit inset into said housing so as not to project significantly beyond said housing, and mounted so as to direct its light in an outward direction relative said forward direction viewed by said camera lens, and a hinged reflector positioned over said flash unit which can be hinged flush with said housing positioned over said flash unit when the flash unit is not in use and hinged to an inclined position when the flash unit is to be used whereby light from the flash unit passes to the reflector which then reflects the light forwardly in the direction viewed by the camera lens, the reflector being shaped such that light from the flash unit is directed predominantly into the area of a scene from which light will be collected by the camera lens for the picture, so avoiding significant wastage of light into areas outside the said area of the scene.

2. A camera according to claim 1 in which said housing is of generally rectangular parallelopiped shape, said housing having a top face and side faces, said electronic flash unit being inset into said top or a side face and said reflector being hinged to that top or side face over said flash unit.

3. A camera according to claim 1 in which said housing is of generally rectangular parallelopiped shape, said housing having a top face into which said electronic flash unit is inset with the reflector being hingedly mounted to the rear of said top face over said flash unit.

4. A camera according to claim 1 in which said electronic flash unit comprises a substantially straight flash tube for emitting light and a substantially parabolic reflector placed substantially axially of the axis of the tube for directing the light in a direction generally outwardly relative the forward direction viewed by said camera lens.

5. A camera according to claim 4 in which said reflector is generally curved relative the axis of the tube, so as to concentrate the light onto the area of the scene being photographed.

6. A camera according to claim 5 in which said reflector is smoothly curved along its width-wise extent relative the axis of the tube.

7. A camera according to claim 5 in which said reflector comprises a substantially flat central portion flanked by inclined substantially flat side portions which reflect light from beyond the respective end of the tube back into the area of the scene being photographed.

* * * * *